US012636768B2

(12) United States Patent
Daily et al.

(10) Patent No.: US 12,636,768 B2
(45) Date of Patent: May 26, 2026

(54) POWER TOOL WITH IMPULSE ASSEMBLY

(71) Applicant: MILWAUKEE ELECTRIC TOOL CORPORATION, Brookfield, WI (US)

(72) Inventors: Paul F. Daily, Waukesha, WI (US); Kylie A. Janczy, Milwaukee, WI (US); Aaron C. Jonckheere, Milwaukee, WI (US); Sarah K. Plunkett, New Berlin, WI (US); Kentez L. Craig, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 19/062,249

(22) Filed: Feb. 25, 2025

(65) Prior Publication Data

US 2025/0276430 A1 Sep. 4, 2025

Related U.S. Application Data

(60) Provisional application No. 63/658,143, filed on Jun. 10, 2024, provisional application No. 63/560,273, filed on Mar. 1, 2024.

(51) Int. Cl.
B25F 5/00 (2006.01)
B25B 21/02 (2006.01)
G01K 3/10 (2006.01)

(52) U.S. Cl.
CPC .............. B25F 5/005 (2013.01); B25B 21/02 (2013.01); G01K 3/10 (2013.01)

(58) Field of Classification Search
CPC ............ B25B 21/02; B25F 5/005; G01K 3/10
See application file for complete search history.

(56) References Cited

U.S. PATENT DOCUMENTS 4,445,636 A * 5/1984 Peters ................ G05D 23/1931
236/20 R
5,592,396 A * 1/1997 Tambini .................. B25B 23/14
702/179

(Continued)

FOREIGN PATENT DOCUMENTS

CN 108705491 A 10/2018
DE 102020211311 A1 3/2022

(Continued)

OTHER PUBLICATIONS

German Patent Office Action for Application No. 102025107245.0 dated Feb. 10, 2026 (15 pages including machine English translation).

*Primary Examiner* — Stephen F. Gerrity
*Assistant Examiner* — David G Shutty
(74) *Attorney, Agent, or Firm* — Michael Best & Friedrich LLP

(57) ABSTRACT

A power tool including a motor, an impulse assembly configured to be driven by the motor, a temperature sensor, and a controller. The temperature sensor is configured to output a signal related to a temperature of the power tool. The temperature of the power tool is correlated to a temperature of a fluid within the impulse assembly. The controller is connected to the temperature sensor. The controller is configured to determine the temperature of the power tool based the signal from the temperature sensor, and control, in response to the temperature of the power tool being greater than a temperature threshold, the power tool based on the temperature of the power tool.

17 Claims, 13 Drawing Sheets

(56)  References Cited

U.S. PATENT DOCUMENTS

| | | | | |
|---|---|---|---|---|
| 5,689,434 | A * | 11/1997 | Tambini | B25B 23/14 |
| | | | | 700/282 |
| 7,036,703 | B2 * | 5/2006 | Grazioli | B25F 5/00 |
| | | | | 702/41 |
| 7,299,963 | B2 * | 11/2007 | Moeller | B25C 1/08 |
| | | | | 228/8 |
| 8,554,389 | B2 * | 10/2013 | Cox | G06F 1/3203 |
| | | | | 320/144 |
| 9,407,195 | B2 * | 8/2016 | Nishii | B25F 5/008 |
| 9,450,471 | B2 * | 9/2016 | Mergener | B25B 21/02 |
| 9,774,229 | B1 * | 9/2017 | Mergener | B25B 21/02 |
| 9,815,160 | B2 | 11/2017 | Nitsche et al. | |
| 9,954,417 | B2 * | 4/2018 | Mergener | H02K 11/33 |
| 9,960,656 | B2 * | 5/2018 | Mergener | H02K 7/145 |
| 9,969,071 | B2 | 5/2018 | Nitsche et al. | |
| 10,471,578 | B2 * | 11/2019 | Barezzani | B23D 29/002 |
| 10,530,220 | B2 * | 1/2020 | Mergener | H05K 1/18 |
| 10,618,151 | B2 | 4/2020 | Kanack et al. | |
| 10,946,509 | B2 | 3/2021 | Mascall | |
| 11,031,843 | B2 * | 6/2021 | Mergener | H02K 7/145 |
| 11,097,403 | B2 | 8/2021 | Carlson et al. | |
| 11,213,934 | B2 * | 1/2022 | Bandy | B25B 23/1475 |
| 11,441,413 | B2 * | 9/2022 | Nield | E21B 44/04 |
| 11,685,028 | B2 | 6/2023 | Kanack et al. | |
| 11,724,368 | B2 * | 8/2023 | Dales | B25B 23/1453 |
| | | | | 173/93.5 |
| 11,872,681 | B2 * | 1/2024 | Dedrickson | B25D 9/125 |
| 12,042,677 | B2 * | 7/2024 | Sauerbier | A62B 3/005 |
| 12,053,862 | B2 * | 8/2024 | Abbott | B25B 21/026 |
| 12,090,607 | B2 * | 9/2024 | Takahagi | B25B 21/026 |
| 12,111,621 | B2 * | 10/2024 | Abbott | B25B 21/00 |
| 12,240,082 | B2 * | 3/2025 | Stickley | B25B 21/005 |
| 2011/0180286 | A1 * | 7/2011 | Oomori | H02K 9/06 |
| | | | | 173/217 |
| 2011/0227430 | A1 * | 9/2011 | Omori | H02K 11/33 |
| | | | | 310/50 |
| 2013/0025892 | A1 * | 1/2013 | Mashiko | B25B 21/026 |
| | | | | 173/2 |
| 2015/0202758 | A1 | 7/2015 | Nitsche et al. | |
| 2017/0252911 | A1 | 9/2017 | Barezzani et al. | |
| 2020/0130162 | A1 * | 4/2020 | Huang | B25F 5/008 |
| 2021/0162574 | A1 * | 6/2021 | Dedrickson | B25D 17/06 |
| 2021/0240145 | A1 | 8/2021 | Abbott | |
| 2021/0252316 | A1 * | 8/2021 | Sauerbier | H02K 11/33 |
| 2021/0296969 | A1 | 9/2021 | Mergener et al. | |
| 2021/0339361 | A1 * | 11/2021 | Abbott | B25B 21/026 |
| 2022/0105610 | A1 | 4/2022 | Bandy et al. | |
| 2022/0118589 | A1 * | 4/2022 | Takahagi | B25B 21/026 |
| 2022/0250214 | A1 * | 8/2022 | Stickley | B25B 23/1456 |
| 2022/0299946 | A1 * | 9/2022 | Abbott | G06N 3/0442 |
| 2023/0191567 | A1 | 6/2023 | Opsitos, Jr. et al. | |
| 2023/0202018 | A1 | 6/2023 | Taylor et al. | |
| 2023/0264332 | A1 | 8/2023 | Neuhoff et al. | |
| 2024/0001520 | A1 | 1/2024 | Kanack et al. | |
| 2025/0144775 | A1 * | 5/2025 | Kamijo | B25F 5/029 |

FOREIGN PATENT DOCUMENTS

| | | | |
|---|---|---|---|
| WO | 2015024809 | A1 | 2/2015 |
| WO | 2023223446 | A1 | 11/2023 |

* cited by examiner

905 — DETERMINE TEMPERATURE CORRELATED TO TEMPERATURE OF FLUID IN IMPULSE MECHANISM

910 — TEMPERATURE ≥ THRESHOLD

NO

YES

915 — CONTROL POWER TOOL BASED ON THE DETERMINED TEMPERATURE

1000

1005 DETERMINE TEMPERATURE CORRELATED TO TEMPERATURE OF FLUID IN IMPULSE MECHANISM

1010 TEMPERATURE ≥ THRESHOLD

NO

YES

1015 SHUTDOWN POWER TOOL

POWER TOOL WITH IMPULSE ASSEMBLY

RELATED APPLICATIONS

This application claims the benefit of U.S. Provisional Patent Application No. 63/560,273, filed Mar. 1, 2024, and U.S. Provisional Patent Application No. 63/658,143, filed Jun. 10, 2024, the entire content of each of which is hereby incorporated by reference.

FIELD

Embodiments described herein relate to power tools.

SUMMARY

Impulse power tools are capable of delivering rotational impacts to a workpiece at high speeds by storing energy in a rotating mass and transmitting it to an output shaft. Such impulse power tools generally have an output shaft, which may or may not be capable of holding a tool bit or engaging a socket. Impulse tools generally utilize the percussive transfers of high momentum, which is transmitted through the output shaft using a variety of technologies, such as electric, oil-pulse, mechanical-pulse, or any suitable combination thereof.

Power tools described herein include a housing, a motor positioned within the housing, an impulse assembly coupled to the motor to receive torque therefrom, the impulse assembly including a cylinder at least partially forming a chamber containing a hydraulic fluid, an anvil positioned at least partially within the chamber, and a hammer positioned at least partially within the chamber and engageable with the anvil for transferring rotational impacts to the anvil, the hammer including a through hole, and a valve configured to control flow of the hydraulic fluid through the through hole.

When the hydraulic fluid reaches a certain temperature, an impulse tool may experience thermal failure. In some instances, it is desirable to shut down the impulse tool before the tool experiences thermal failure. However, it is difficult to measure the temperature of the hydraulic fluid directly. Therefore, embodiments described herein provide a system and process for controlling an impulse tool using a determined temperature that correlates to a temperature of a fluid within the impulse mechanism. The determined temperature may be based on one or more signals from temperature sensors away from a path of airflow circulation in the impulse tool (for example, one or more temperature sensors positioned on a light assembly PCB) or one or more temperature sensors positioned on a Hall effect sensor PCB.

Power tools described herein include a motor, an impulse assembly configured to be driven by the motor, a temperature sensor, and a controller. The temperature sensor is configured to output a signal related to a temperature of the power tool. The temperature of the power tool is correlated to a temperature of a fluid within the impulse assembly. The controller is connected to the temperature sensor. The controller is configured to determine the temperature of the power tool based the signal from the temperature sensor, and control, in response to the temperature of the power tool being greater than a temperature threshold, the power tool based on the temperature of the power tool.

In some aspects, to control the power tool based on the temperature of the power tool, the controller is configured to one of shut down the power tool or reduce an output of the power tool.

In some aspects, the temperature sensor is positioned away from a path of airflow circulation within the power tool.

In some aspects, the temperature sensor is positioned on a light assembly printed circuit board ("PCB").

In some aspects, the temperature sensor is positioned on a Hall effect sensor printed circuit board ("PCB").

In some aspects, the controller is further configured to compare, in response to the temperature of the power tool being less than the temperature threshold and greater than or equal to a second temperature threshold, an amount of time for which the temperature of the power tool is less than first temperature threshold and greater than or equal to the second temperature threshold to a time threshold, and disable, in response to the amount of time reaching the time threshold, the power tool.

Power tools described herein include a motor, an impulse assembly configured to be driven by the motor, a first temperature sensor, a second temperature sensor, and a controller. The first temperature sensor is configured to output a first signal related to a temperature of the power tool. The temperature of the power tool is correlated to a temperature of a fluid within the impulse assembly. The second temperature sensor is configured to output a second signal related to the temperature of the power tool. The controller is connected to the first temperature sensor and the second temperature sensor. The controller is configured to determine the temperature of the power tool based the first signal from the first temperature sensor and the second signal from the second temperature sensor, and control, in response to the temperature of the power tool being greater than a temperature threshold, the power tool based on the temperature of the power tool.

In some aspects, to control the power tool based on the temperature of the power tool, the controller is configured to shut down the power tool.

In some aspects, the first temperature sensor and the second temperature sensor are positioned away from a path of airflow circulation within the power tool.

In some aspects, the first temperature sensor is positioned on a light assembly printed circuit board ("PCB").

In some aspects, the second temperature sensor is positioned on a Hall effect sensor PCB.

In some aspects, the controller is further configured to compare, in response to the temperature of the power tool being less than the temperature threshold and greater than or equal to a second temperature threshold, an amount of time for which the temperature of the power tool is less than first temperature threshold and greater than or equal to the second temperature threshold to a time threshold, and disable, in response to the amount of time reaching the time threshold, the power tool.

Methods of controlling a power tool described herein include receiving, from a temperature sensor, a signal related to a temperature of the power tool, the temperature of the power tool being correlated to a temperature of a fluid within an impulse assembly, determining the temperature of the power tool based the signal from the temperature sensor, and controlling, in response to the temperature of the power tool being greater than a temperature threshold, the power tool based on the temperature of the power tool.

In some aspects, controlling the power tool based on the temperature of the power tool includes one or shutting down the power tool or reducing an output of the power tool.

In some aspects, the temperature sensor is positioned away from a path of airflow circulation within the power tool.

In some aspects, the temperature sensor is positioned on a light assembly printed circuit board ("PCB").

In some aspects, the temperature sensor is positioned on a Hall effect sensor printed circuit board ("PCB").

In some aspects, the method further includes comparing, in response to the temperature of the power tool being less than the temperature threshold and greater than or equal to a second temperature threshold, an amount of time for which the temperature of the power tool is less than first temperature threshold and greater than or equal to the second temperature threshold to a time threshold, and disabling, in response to the amount of time reaching the time threshold, the power tool.

In some aspects, the temperature sensor is positioned within the impulse assembly.

In some aspects, the method further includes receiving, from a second temperature sensor, a second signal related to the temperature of the power tool, the temperature of the power tool being correlated to the temperature of the fluid within an impulse assembly.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Other aspects of the disclosure will become apparent by consideration of the detailed description and accompanying drawings.

BRIEF DESCRIPTION OF THE DRAWINGS

FIG. 5 illustrates a motor and a Hall effect sensor printed circuit board for the power tool of FIG. 1, according to some embodiments.

DETAILED DESCRIPTION

Figure 1:
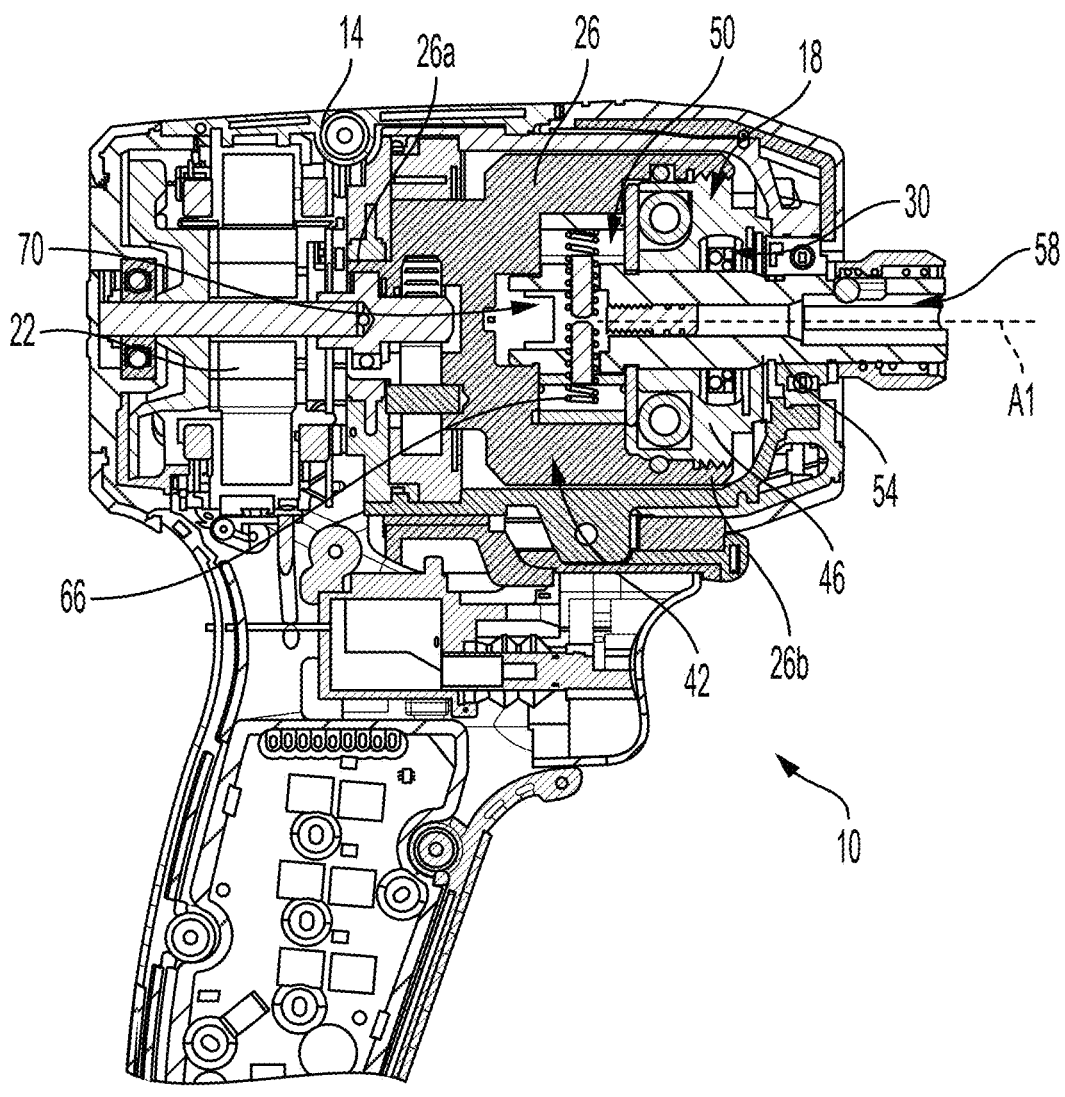
FIG. 1 is a cross-sectional view of a power tool, according to some embodiments.

With reference to FIG. 1, a power tool (e.g., an impulse tool 10) embodying aspects of the present disclosure is shown. The impulse tool 10 includes a main housing 14 and a rotational impulse assembly 18 (see FIG. 2) positioned within the main housing 14. The impulse tool 10 also includes an electric motor 22 (e.g., a brushless direct current motor) coupled to the impulse assembly 18 to provide torque thereto and positioned within the main housing 14, and a transmission (e.g., a single or multi-stage planetary transmission) positioned between the motor 22 and the impulse assembly 18. In some embodiments, the impulse tool 10 is battery-powered and is configured to be powered by a rechargeable power tool battery pack.

Figure 2:
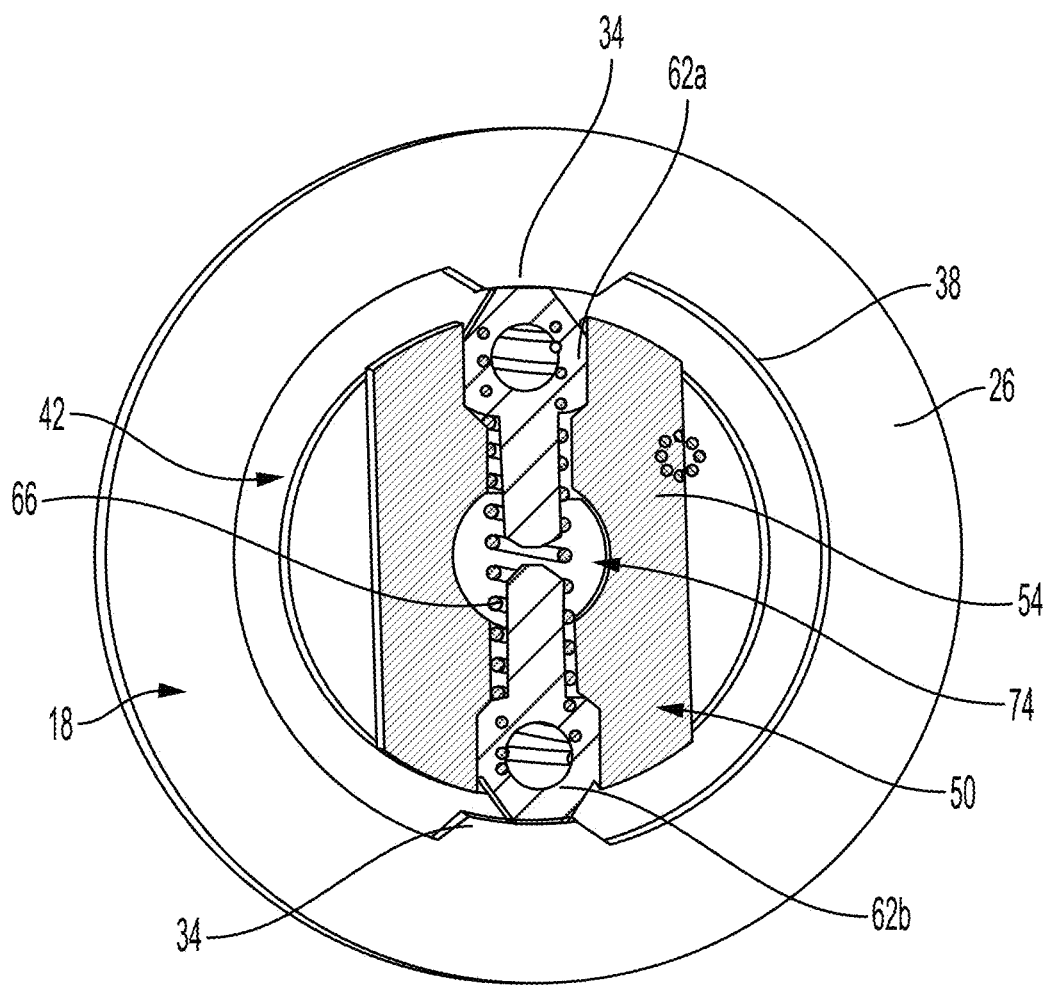
FIG. 2 is a cross-sectional view of an impulse assembly for the power tool of FIG. 1, according to some embodiments.

With reference to FIGS. 1 and 2, the illustrated impulse assembly 18 includes a hammer 26 and an anvil 30. A driven end 26a of the hammer 26 is coupled to the electric motor 22 to receive torque therefrom, causing the hammer 26 to rotate. In some embodiments, a transmission, such as a planetary transmission, may be provided between the electric motor 22 and the hammer 26 to provide a speed reduction and torque increase from the electric motor 22 to the hammer 26. In such embodiments, the hammer 26 may be coupled to or may integrally include a carrier of the planetary transmission.

Referring to FIG. 2, the hammer 26 includes hammer lugs 34 that are configured to impact the anvil 30 as the motor 22 drives rotation of the hammer 26. Specifically, the illustrated hammer 26 includes two hammer lugs 34. The hammer lugs 34 extend inward from an inner circumferential surface 38 of the hammer 26. The hammer 26 at least partially defines a hammer chamber 42 that contains an incompressible fluid (e.g., hydraulic fluid, oil, etc.). The hammer chamber 42 is sealed and is also partially defined by an end cap 46 threadedly secured to a front end 26b of the hammer 26 that is opposite from the driven end 26a (FIG. 1). The hydraulic fluid in the hammer chamber 42 may reduce the wear and the noise of the impulse assembly 18 that is created by impacting the hammer 26 and the anvil 30.

The anvil 30 is positioned at least partially within the hammer chamber 42 and includes a blade assembly 50 and an output shaft 54 with a hexagonal receptacle 58 therein for receipt of a tool bit. The blade assembly 50 includes blades 62a, 62b that are configured to receive impacts from the hammer lugs 34 and a spring 66 that biases each of the blades 62a, 62b into engagement with the inner circumferential surface 38 of the hammer 26.

The illustrated blade assembly 50 includes two blades 62a, 62b such that each blade 62a, 62b is configured to receive an impact from a corresponding one of the hammer lugs 34. Each of the blades 62a, 62b extends through the output shaft 54 such that the blades 62a, 62b are configured to transfer rotational impacts from the hammer lugs 34 to the output shaft 54. In the illustrated embodiment, the blade assembly 50 includes a single spring 66 that biases both of the blades 62a, 62b. In some embodiments, the blade assembly 50 may include two springs such that each spring biases a corresponding blade 62a, 62b. The output shaft 54 extends from the hammer chamber 42 and through the end cap 46. The output shaft 54 extends along and is configured to rotate about an axis A1. The output shaft 54 defines an anvil chamber 70 and fill holes 74 that place the anvil chamber 70 in fluid communication with the hammer chamber 42. The fill holes 74 may be intermittently opened and closed to enable and inhibit flow of the hydraulic fluid between the hammer chamber 42 and the anvil chamber 70.

Figure 3:
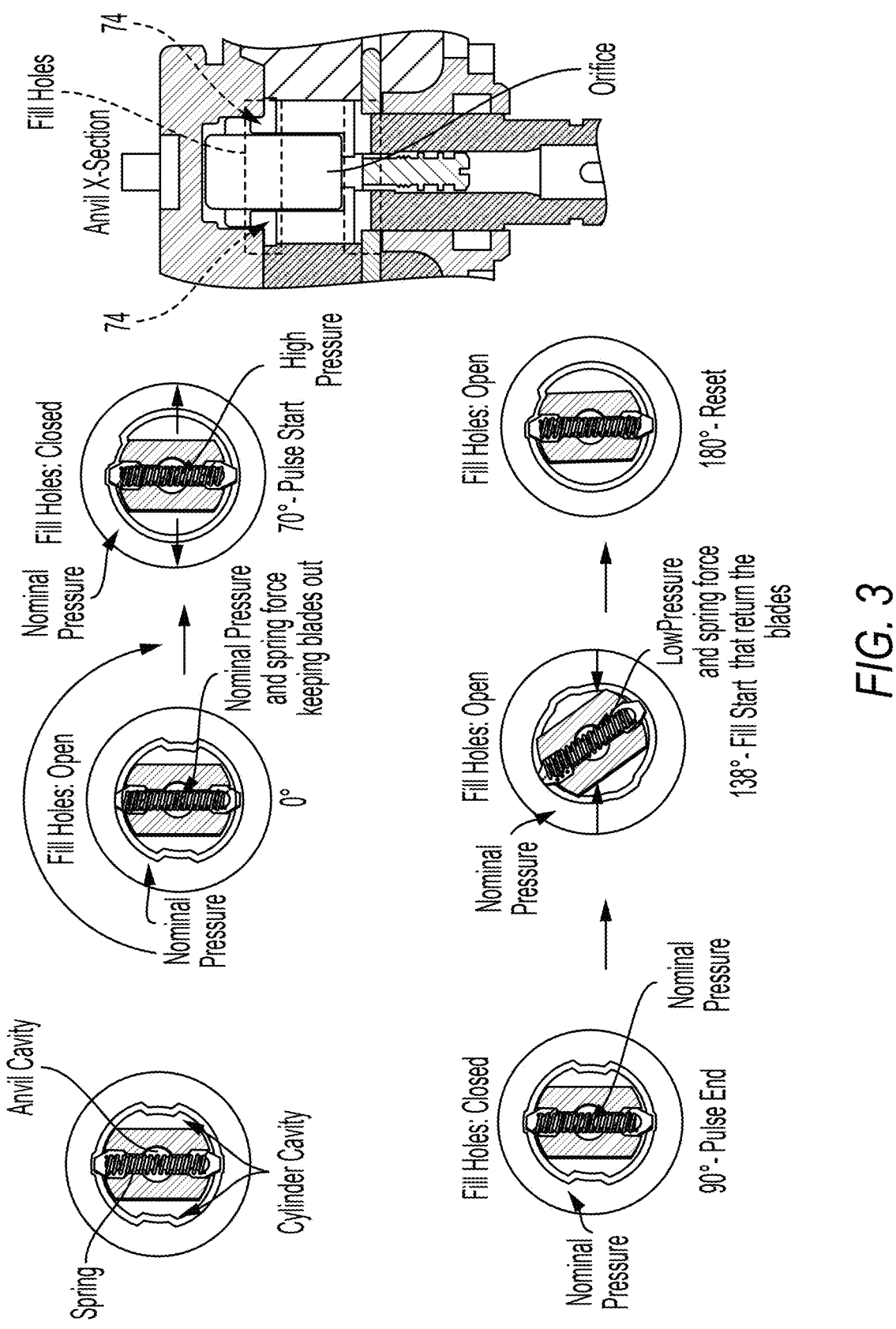
FIG. 3 is a schematic illustrating operation of the impulse assembly of FIG. 2, according to some embodiments.

With reference to FIGS. 1-3, at the start of operation of the impulse tool 10, the fill holes 74 in the output shaft 54 are open and allow hydraulic fluid to flow freely between the hammer chamber 42 and the anvil chamber 70. As such, the pressure in the hammer chamber 42 and the pressure in the anvil chamber 70 are equal at the start of operation. During operation, each of the hammer lugs 34 intermittently applies rotational impacts on a corresponding one of the blades 62a, 62b to impart consecutive rotational impacts to the output shaft 54. As the hammer lugs 34 begin to strike the blades 62a, 62b (i.e., a pulse start), the fill holes 74 may close and pressure of the hydraulic fluid within the anvil chamber 70 may rapidly increase such that the pressure in anvil chamber 70 is relatively higher than the pressure of hydraulic fluid in the hammer chamber 42. As impact progresses, the hammer lugs 34 may ramp up and slip over the blades 62a, 62b, thereby pushing the blades 62a, 62b against the bias of the spring 66 and against the relatively higher pressure of fluid in the anvil chamber 70. The fluid within the anvil chamber 70 may be forced out into the hammer chamber 42 through a restricted orifice to allow the blades 62a, 62b to move inwardly towards the axis A1. As the blades 62a, 62b move inwardly, the relatively higher pressure within the anvil chamber 70 may begin to be relieved through the orifice such that fluid in the hammer chamber 42 and the anvil chambers 70 approach equal levels. The hydraulic fluid may thus slow and damp inward movement of the blades 62a, 62b and thereby increase the duration over which the hammer lugs 34 engage the blades 62a, 62b. The hydraulic fluid may also reduce noise emissions and inhibit wear on the components of the hammer 26 and the anvil 30 throughout impact.

Once the hammer lugs 34 pass over the blades 62a, 62b (e.g., a pulse end), the springs 66 bias the blades 62a, 62b outwardly from the axis A1 and back into engagement with the inner circumferential surface 38 of the hammer 26. Additionally, the fill holes 74 may open again, allowing hydraulic fluid to pass between the hammer chamber 42 and the anvil chamber 70. As the spring 66 biases the blades 62a, 62b outwardly, the pressure within the anvil chamber 70 may be relatively lower than the pressure in the hammer chamber 42. As such, the hydraulic fluid may flow from the hammer chamber 42 to the anvil chamber 70 until the pressures in each chamber 42, 70 are equal. With the blades 62a, 62b biased into engagement with the inner circumferential surface 38 of the hammer 26 and the pressures within each chamber 42, 70 equal, the impulse assembly 18 is ready for another impact and for the cycle to repeat.

Figure 4:
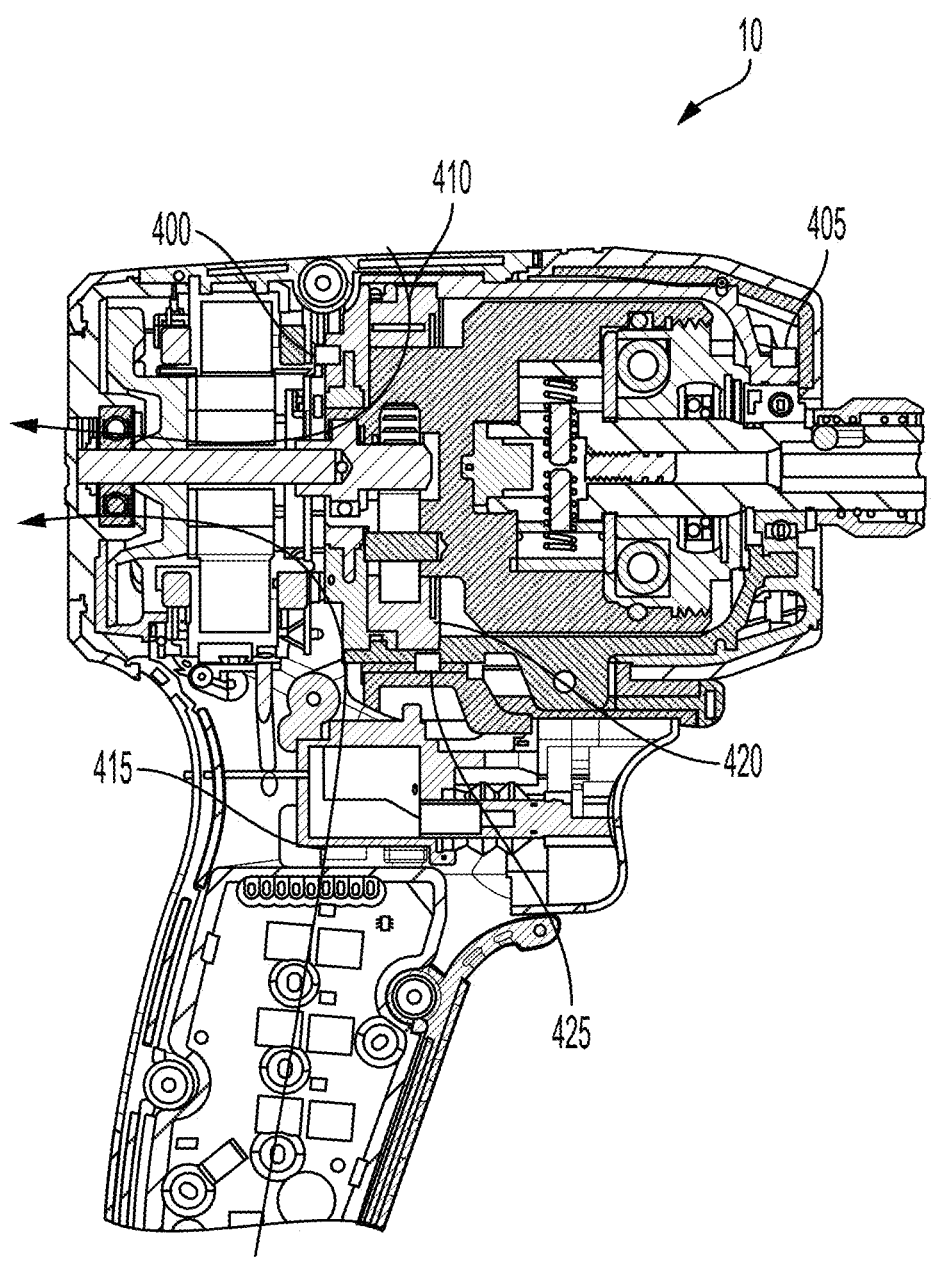
FIG. 4 is a cross-sectional view of the power tool of FIG. 1, according to some embodiments.

FIG. 4 illustrates a cross-sectional view of the impulse tool 10. As shown in FIG. 4, the impulse tool 10 includes a first temperature sensor (e.g., a thermistor, a thermocouple, etc.) or a first plurality of temperature sensors (e.g., a thermistor, a thermocouple, etc.) 400 mounted to a Hall effect sensor printed circuit board ("PCB"). The Hall effect sensor PCB can be mounted to a stator of a motor within the impulse tool 10. The impulse tool 10 also includes a second temperature sensor (e.g., a thermistor) or a second plurality of temperature sensors (e.g., thermistors) 405 mounted to a light assembly printed circuit board ("PCB"). In some embodiments, the temperature sensor 405 is mounted to a bolt plate. The temperature sensors 400, 405 can be used to indirectly measure a temperature of a fluid in the impulse assembly 18 or, in other words, determine a temperature that is correlated with the temperature of the fluid in the impulse assembly 18. FIG. 4 also illustrates airflow paths 410, 415 for the impulse tool 10, which can affect the temperature measurements using the temperature sensor 405. In some embodiments, a gearcase 420 for the transmission includes an additional temperature sensor 425 (e.g., a thermistor, a thermocouple, etc.) coupled to the gearcase 420.

Figure 5:
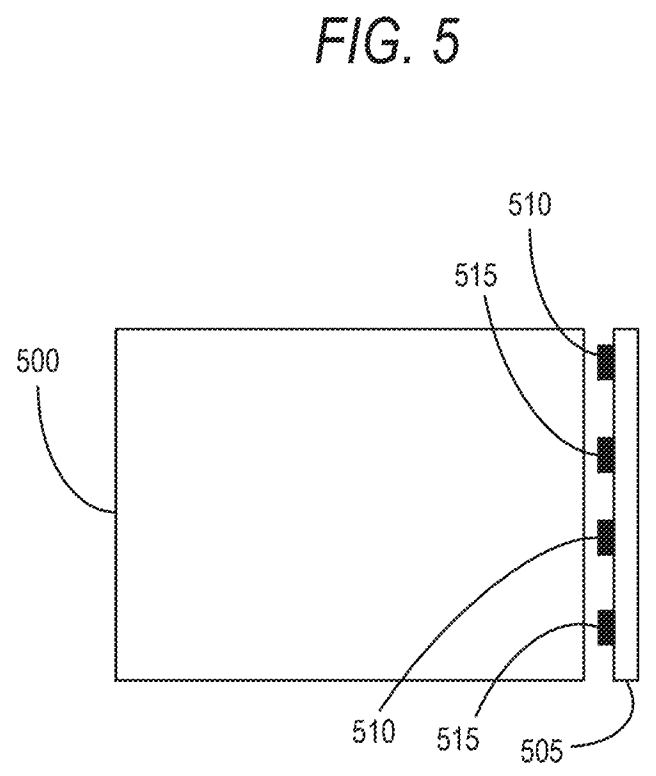

FIG. 5 illustrates a motor 500 adjacent to a Hall effect sensor PCB 505 for the impulse tool 10. The Hall effect sensor PCB 505 includes a plurality of Hall effect sensors 510 positioned, for example, on a first side of the Hall effect sensor PCB 505. The Hall effect sensor PCB 505 includes one or more temperature sensors (e.g., thermistors, thermocouples, etc.) 515. In some embodiments, a single temperature sensor is implemented. In other embodiments, a plurality of temperature sensors are implemented. The temperature sensors 515 can be used to measure a temperature of a fluid in the impulse assembly 18. It should be noted that while each of the temperature sensors 515 are illustrated in FIG. 5 as being positioned on the first side of the PCB, in some embodiments, one or more of the temperature sensors 515 may be positioned on a second, opposite side of the PCB. In some embodiments, the temperature sensors 515 may be positioned on only the second side of the Hall effect sensor PCB.

Figure 6:
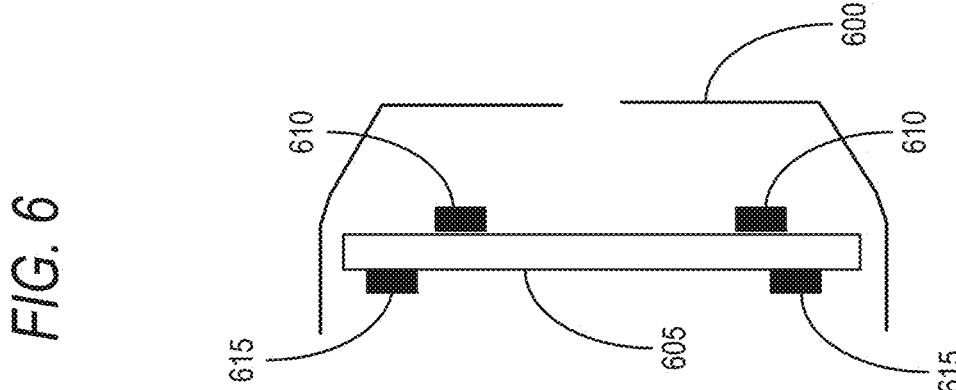
FIG. 6 illustrates a light assembly printed circuit board for the power tool of FIG. 1, according to some embodiments.

FIG. 6 illustrates a nose cone 600 for the impulse tool 10 that surrounds a light assembly PCB 605. The light assembly PCB 605 includes a plurality of lights or LEDs 610 positioned, for example, on a first side of the light assembly PCB 605. The light assembly PCB 605 includes one or more temperature sensors (e.g., thermistors, thermocouples, etc.) 615. In some embodiments, a single temperature sensor is positioned on the light assembly PCB 605. In other embodiments, a plurality of temperature sensors are positioned on the light assembly PCB 605. The temperature sensors 615 can be used to measure a temperature of a fluid in the impulse assembly 18. In some embodiments, the temperature sensors 615 are removed from or positioned away from a path of airflow circulation in the impulse tool 10.

Figure 7:
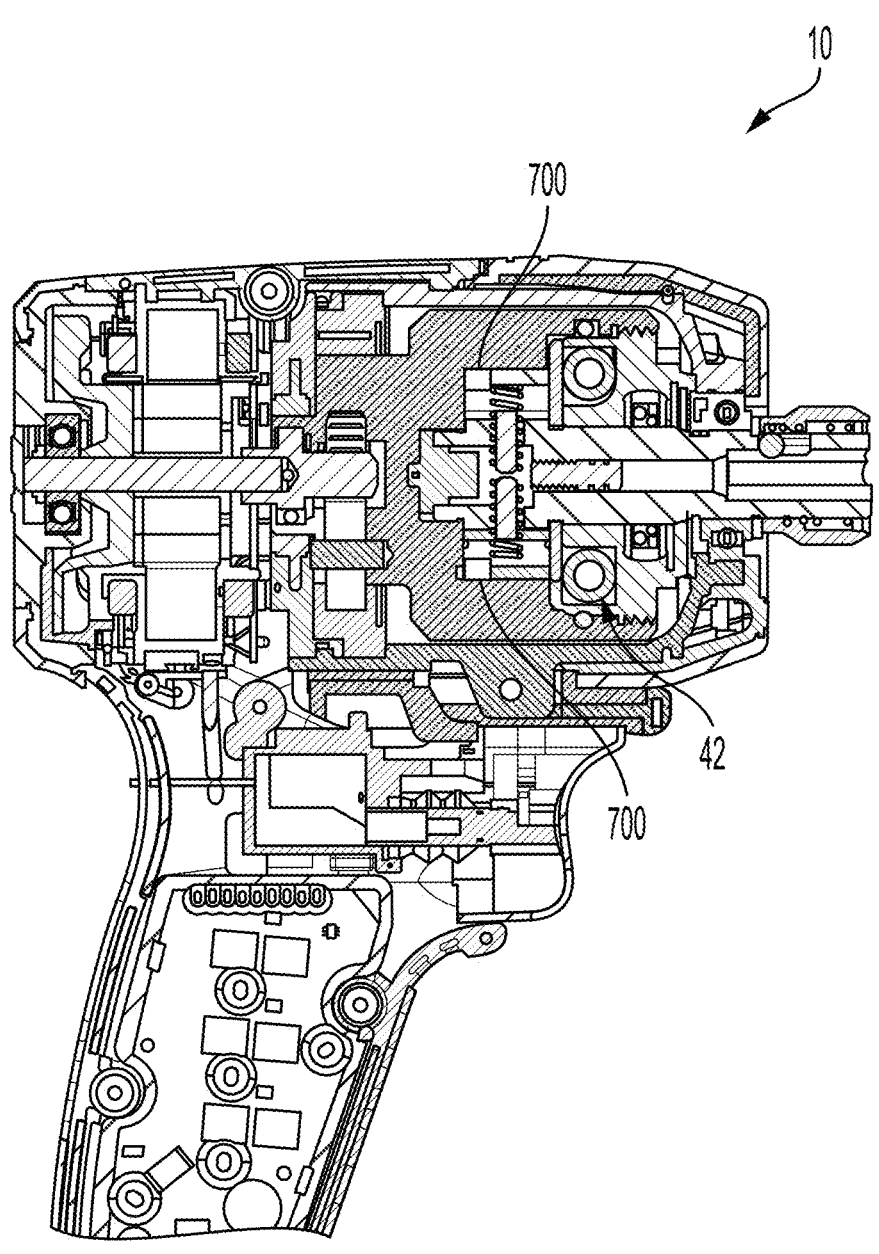
FIG. 7 is a cross-sectional view of the power tool of FIG. 1, according to some embodiments.

FIG. 7 illustrates the impulse assembly 18 of the impulse tool 10. In the embodiment illustrated in FIG. 7, one or more temperature sensors (e.g., thermistors) 700 are positioned within the hammer chamber 42 of the impulse assembly 18.

Figure 8:
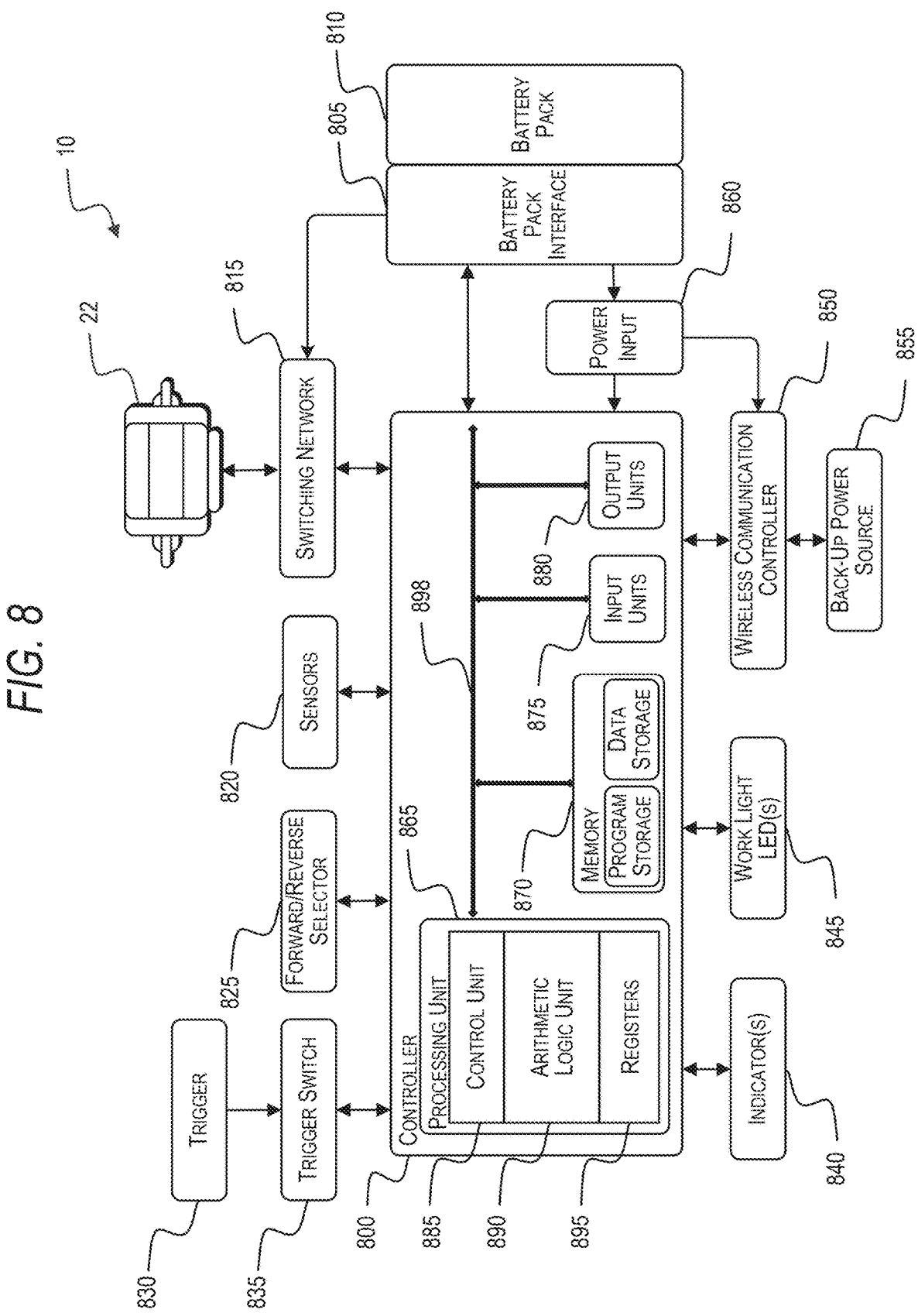
FIG. 8 illustrates a control system for the power tool of FIG. 1, according to some embodiments.

As shown in FIG. 8, the impulse tool 10 includes the motor 22. The motor 22 actuates a drive device and allows the drive device to perform the particular task (e.g., provide a rotational output to drive a fastener). The motor 22 may include a rotor and a stator. The rotor may be coupled to a motor shaft to produce a rotational output to the output drive device directly or via one or more gears. A primary power source (e.g., a battery pack) 810 couples to the impulse tool 10 and provides electrical power to energize the motor 22. The motor 22 is energized based on the position of a trigger 830. When the trigger 830 is depressed the motor 22 is energized, and when the trigger 830 is released, the motor 22 is de-energized. In the illustrated embodiment, the trigger

830 extends partially down a length of a handle. In other embodiments, the trigger 830 extends down the entire length of the handle or may be positioned elsewhere on the impulse tool 10. The trigger 830 is moveably coupled to the handle such that the trigger 830 moves with respect to the tool housing. The trigger 830 is coupled to a push rod, which is engageable with a trigger switch 835. The trigger 830 moves in a first direction towards the handle when the trigger 830 is depressed by the user. The trigger 830 is biased (e.g., with a spring) such that it moves in a second direction away from the handle, when the trigger 830 is released by the user. When the trigger 830 is depressed by the user, the push rod activates the trigger switch 835, and when the trigger 830 is released by the user, the trigger switch 835 is deactivated. In some embodiments, the trigger 1130 is disconnected from the electrical trigger switch 835. In such embodiments, the trigger switch 835 may include, for example, a transistor. Additionally, for such electronic embodiments, the trigger 830 may not include a push rod to activate the mechanical switch. Rather, the electrical trigger switch 835 may be activated by, for example, a position sensor (e.g., a Hall effect sensor) that relays information about the relative position of the trigger 830 to the tool housing or electrical trigger switch 835. The trigger switch 835 outputs a signal indicative of the position of the trigger 830. In some instances, the signal is binary and indicates either that the trigger 830 is depressed or released. In other instances, the signal indicates the position of the trigger 830 with more precision. For example, the trigger switch 835 may output an analog signal that varies from 0 to 5 volts depending on the extent that the trigger 830 is depressed. For example, 0 V output indicates that the trigger 830 is released, 1 V output indicates that the trigger 830 is 20% depressed, 2 V output indicates that the trigger 830 is 40% depressed, 3 V output indicates that the trigger 830 is 60% depressed, 4 V output indicates that the trigger 830 is 80% depressed, and 5 V indicates that the trigger 830 is 100% depressed. The signal output by the trigger switch 835 may be analog or digital.

As also shown in FIG. 8, the impulse tool 10 includes a switching network 815, sensors 820, indicators 840, a battery pack interface 805, a power input unit 860, an electronic controller 800, a wireless communication controller 850, and a back-up power source 855. The back-up power source 855 includes, in some embodiments, a coin cell battery or another similar small replaceable power source. The battery pack interface 805 is coupled to the electronic controller 800 and couples to the battery pack 810. The battery pack interface 805 includes a combination of mechanical (e.g., a battery pack receiving portion) and electrical components configured to and operable for interfacing (e.g., mechanically, electrically, and communicatively connecting) the impulse tool 10 with the battery pack 810. The battery pack interface 805 is coupled to the power input unit 860. The battery pack interface 805 transmits the power received from the battery pack 810 to the power input unit 860. The power input unit 1160 includes active and/or passive components (e.g., voltage step-down controllers, voltage converters, rectifiers, filters, etc.) to regulate or control the power received through the battery pack interface 805 and to the wireless communication controller 850 and controller 800.

The switching network 815 enables the electronic controller 800 to control the operation of the motor 22. Generally, when the trigger 830 is depressed as indicated by an output of the trigger switch 835, electrical current is supplied from the battery pack interface 805 to the motor 22, via the switching network 815. When the trigger 830 is not depressed, electrical current is not supplied from the battery pack interface 805 to the motor 22.

In response to the electronic controller 800 receiving the activation signal from the trigger switch 835, the electronic controller 800 activates the switching network 815 to provide power to the motor 22. The switching network 815 controls the amount of current available to the motor 22 and thereby controls the speed and torque output of the motor 22. The switching network 815 may include numerous FETs, bipolar transistors, or other types of electrical switches. For instance, the switching network 1115 may include a six-FET bridge that receives pulse-width modulated ("PWM") signals from the electronic controller 800 to drive the motor 22.

The sensors 820 are coupled to the electronic controller 800 and communicate to the electronic controller 800 various signals indicative of different parameters of the impulse tool 10 or the motor 22. The sensors 820 include Hall effect sensors, among other sensors, such as, for example, one or more voltage sensors, one or more temperature sensors (e.g., temperature sensors 400, 405, 515, 615, 700), one or more torque sensors, etc. One or more signals from the temperature sensors 400, 405, 515, 615, 700 can be used by the controller 800 to determine a temperature correlated to a temperature of the fluid within the impact mechanism. For example, the temperature of the fluid can be determined or estimated is based on testing data used to correlate those temperatures determined to internal fluid data (e.g., bench testing, manual measurement of fluid temperature, etc.). In some embodiments, the temperature of the fluid is not directly measured (i.e., indirect measurement). In other embodiments, the temperature of the fluid can be directly measured (e.g., using temperature sensors 700). Each Hall effect sensor outputs motor feedback information to the electronic controller 800, such as an indication (e.g., a pulse) when a magnet of the motor's rotor rotates across the face of that Hall effect sensor. Based on the motor feedback information from the Hall effect sensors, the electronic controller 800 can determine the position, velocity, and acceleration of the rotor. In response to the motor feedback information and the signals from the trigger switch 835, the electronic controller 800 transmits control signals to control the switching network 815 to drive the motor 22. For instance, by selectively enabling and disabling the FETs of the switching network 815, power received via the battery pack interface 805 is selectively applied to stator coils of the motor 22 to cause rotation of its rotor. The motor feedback information is used by the electronic controller 800 to ensure proper timing of control signals to the switching network 815 and, in some instances, to provide closed-loop feedback to control the speed of the motor 22 to be at a desired level.

The indicators 840 are also coupled to the electronic controller 800 and receive control signals from the electronic controller 800 to turn on and off or otherwise convey information based on different states of the impulse tool 10. The indicators 840 include, for example, one or more light-emitting diodes ("LED") or a display screen. The indicators 840 can be configured to display conditions of, or information associated with, the impulse tool 10. For example, the indicators 840 are configured to indicate measured electrical characteristics of the impulse tool 10, the status of the impulse tool 10, the mode of the power tool, etc. The indicators 840 may also include elements to convey information to a user through audible or tactile outputs. Work light LEDs 845 are also controllable by the electronic controller 800, for example, to illuminate in response to the trigger 830 being actuated.

As described above, the electronic controller 800 is electrically and/or communicatively connected to a variety of components of the impulse tool 10. In some embodiments, the electronic controller 800 includes a plurality of electrical and electronic components that provide power, operational control, and protection to the components within the electronic controller 800 and/or impulse tool 10. For example, the electronic controller 800 includes, among other things, a processing unit 865 (e.g., a microprocessor, a microcontroller, an electronic controller, an electronic processor, or another suitable programmable device), a memory 870, input units 875, and output units 880. The processing unit 865 (herein, electronic processor 865) includes, among other things, a control unit 885, an arithmetic logic unit ("ALU") 890, and a plurality of registers 895 (shown as a group of registers in FIG. 8). In some embodiments, the electronic controller 800 is implemented partially or entirely on a semiconductor (e.g., a field-programmable gate array ["FPGA"] semiconductor) chip, such as a chip developed through a register transfer level ("RTL") design process.

The memory 870 is a non-transitory computer readable medium and includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 865 is connected to the memory 870 and executes software instructions that are capable of being stored in a RAM of the memory 870 (e.g., during execution), a ROM of the memory 870 (e.g., on a generally permanent basis), or another non-transitory computer readable medium such as another memory or a disc. Software included in the implementation of the impulse tool 10 can be stored in the memory 870 of the electronic controller 800. The software includes, for example, firmware, one or more applications, program data, filters, rules, one or more program modules, and other executable instructions. The electronic controller 800 is configured to retrieve from memory and execute, among other things, instructions related to the control processes and methods described herein. The electronic controller 800 is also configured to store power tool information on the memory 870 including operational data, information identifying the type of tool, a unique identifier for the particular tool, and other information relevant to operating or maintaining the impulse tool 10. The tool usage information, such as current levels, motor speed, motor acceleration, motor direction, number of impacts, may be captured or inferred from data output by the sensors 820. Such power tool information may then be accessed by a user with an external device. In other constructions, the electronic controller 800 includes additional, fewer, or different components.

The wireless communication controller 850 is coupled to the electronic controller 800 or integrated into the electronic controller 800. In the illustrated embodiment, the wireless communication controller 850 is located near the foot of the impulse tool 10 to save space and ensure that the magnetic activity of the motor 22 does not affect the wireless communication between the impulse tool 10 and the external device.

Figure 9:
FIG. 9 illustrates a process for controlling the power tool of FIG. 1, according to some embodiments.
Figure 9:
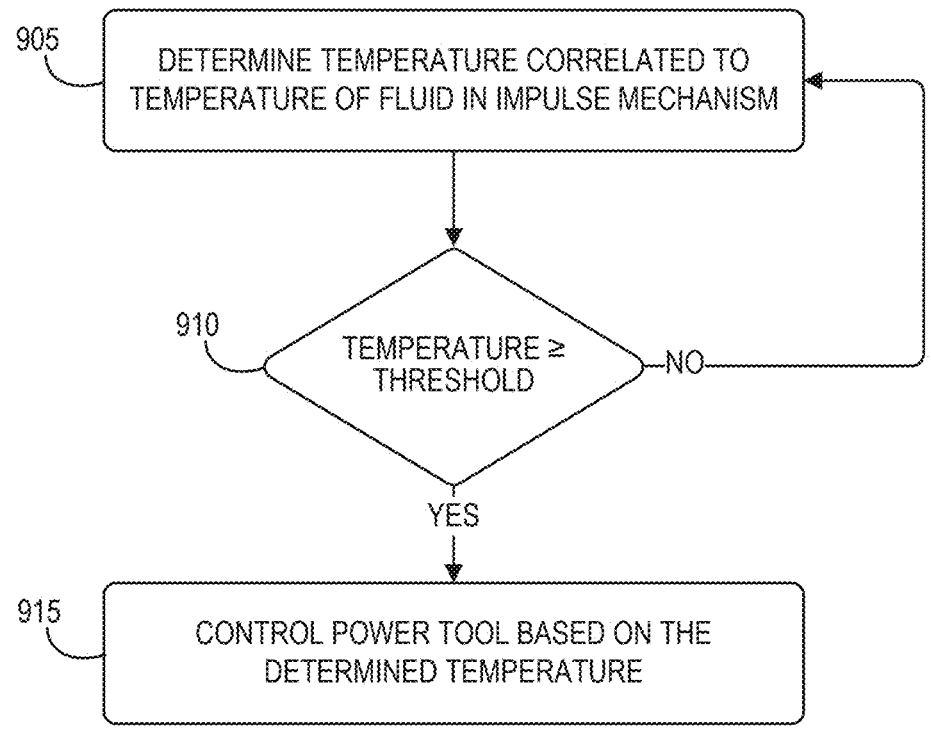

FIG. 9 illustrates a process 900 for controlling the impulse tool 10. The process 900 begins with the determining a temperature based on one or more signals from the temperature sensors 400, 405, 515, 615, 700 (STEP 905). In some embodiments, the determined temperature correlates to a temperature of a fluid within the impulse mechanism (e.g., impulse assembly 18). If the determined temperature is greater than a temperature threshold at STEP 910, the controller 800 controls the impulse tool 10 based on the determined temperature (e.g., reduces an output of the impulse tool 10, shuts down the impulse tool 10, or otherwise disables operation of the impulse tool 10) (STEP 915). In some embodiments, when multiple temperature sensors are used to determine the temperature correlated to the fluid in the impulse mechanism, one temperature sensor can be weighted more heavily than the other. For example, the temperature sensors 405, 615, which are outside of the airflow path of the impulse tool 10 can be weighted more heavily (e.g., as a more reliable representation of fluid temperature).

Figure 10:
FIG. 10 illustrates a process for controlling the power tool of FIG. 1, according to some embodiments.
Figure 10:
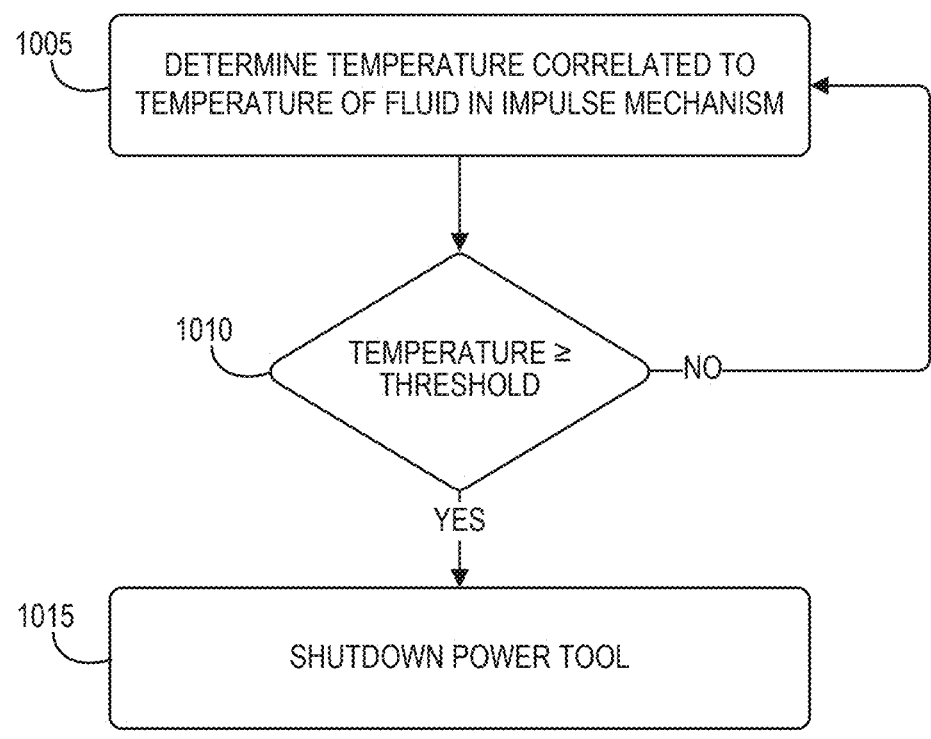

FIG. 10 illustrates a process 1000 for controlling the impulse tool 10 based on one or more signals from temperature sensors positioned away from a path of airflow circulation in the impulse tool 10. The process 1000 begins with the determining a temperature based on one or more signals from the temperature sensors 405, 615 that are at a distal location on the impulse tool 10 away from a path of airflow circulation in the impulse tool 10 (STEP 1005). In some embodiments, the determined temperature correlates to a temperature of a fluid within the impulse mechanism (e.g., impulse assembly 18). In some embodiments, the controller 800 correlates the determined temperature to the temperature of the fluid based on the specific heat capacity of the materials of components positioned between the fluid and the temperature sensors 405, 615. If the determined temperature is greater than a temperature threshold at STEP 1010, the controller 800 controls the impulse tool 10 to shut down or otherwise disable operation of the impulse tool 10 at STEP 1015. In some embodiments, when the determined temperature is greater than the temperature threshold, the temperature of the fluid within the impulse mechanism is, or is likely, above an acceptable temperature for safe operation of the impulse tool 10.

Figure 11:
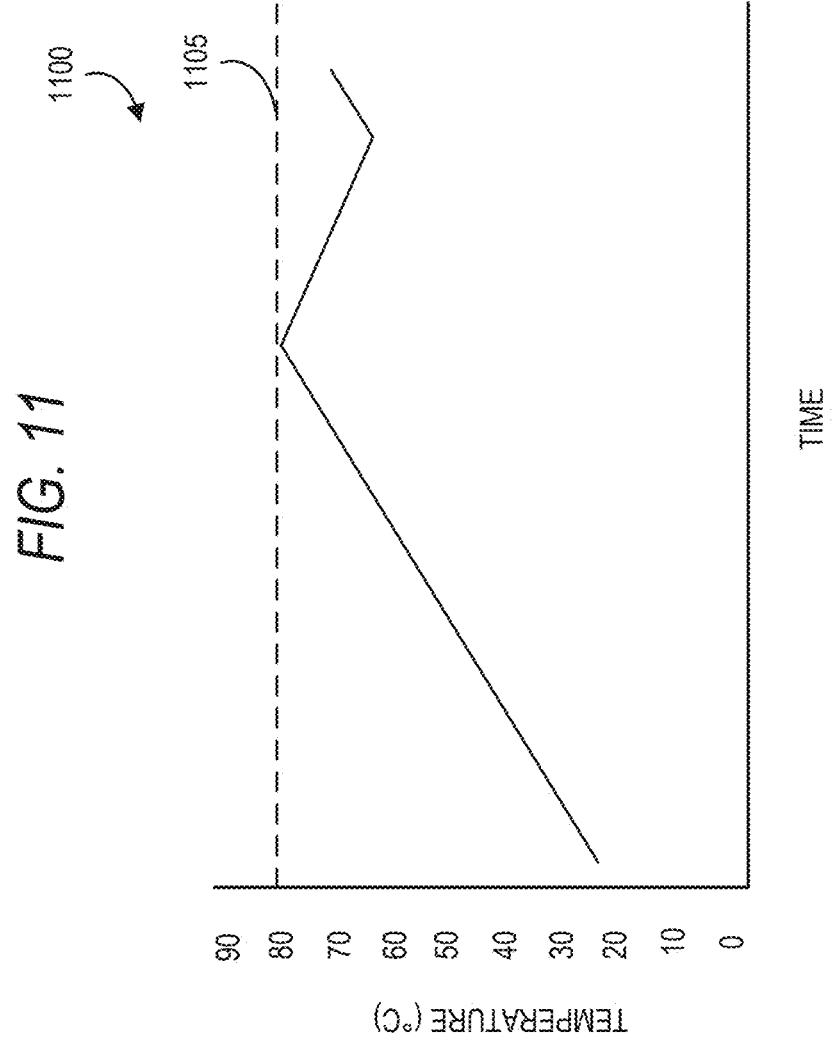
FIG. 11 is a graph illustrating operation of the power tool of FIG. 1, according to some embodiments.

FIG. 11 illustrates a graph 1100 of the operation of the impulse tool 10 based on one or more signals from temperature sensors positioned away from a path of airflow circulation in the impulse tool 10. A temperature threshold 1105 (e.g., 80° C.) is illustrated. In response to the temperature determined based on one or more signals from temperature sensors positioned away from a path of airflow circulation in the impulse tool 10 reaching the temperature threshold 1105, the controller 800 controls the impulse tool 10 to shut down or otherwise disables operation of the impulse tool 10. In some embodiments, the graph 1100 corresponds to control of the impulse tool 10 based on one or more temperature signals from the temperature sensors 405, 615. It should be noted that when the determined temperature reaches 80° C., the temperature of the fluid in the impulse assembly 18 may be significantly higher than 80° C.

Figure 12:
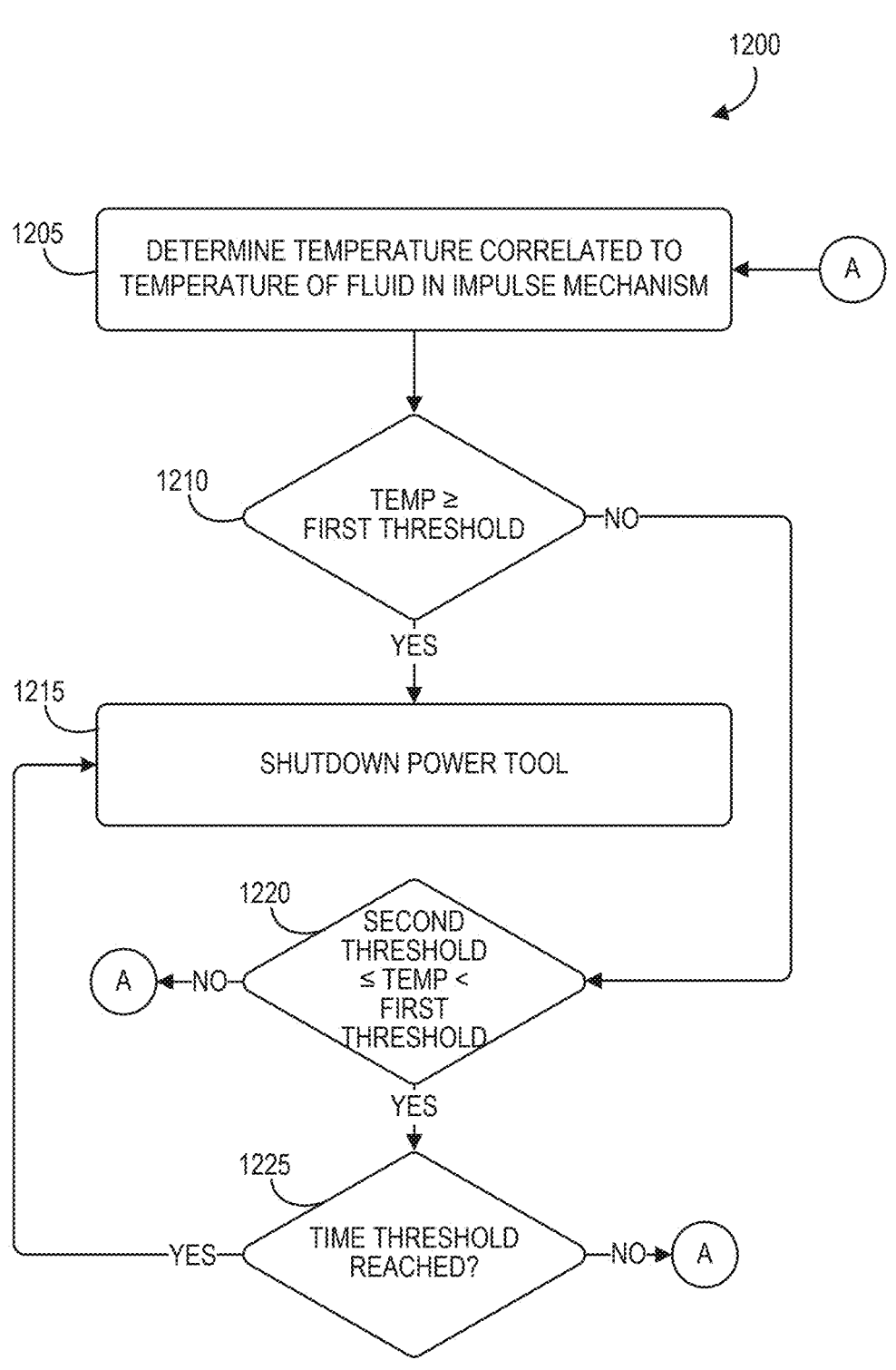
FIG. 12 illustrates a process for controlling the power tool of FIG. 1, according to some embodiments.

FIG. 12 is a process 1200 for controlling the impulse tool 10 based on one or more signals from temperature sensors positioned on the Hall effect sensor PCB 505. The process 1200 begins with determining a temperature based on one or more signals from the temperature sensors 400, 515 (STEP 1205) positioned on a Hall effect sensor PCB (for example, the Hall effect sensor PCB 505). In some embodiments, the determined temperature correlates to a temperature of a fluid within the impulse mechanism (e.g., impulse assembly 18). However, factors may influence the temperature determined at STEP 1205, preventing a direct correlation between the determined temperature and the temperature of the fluid within the impulse mechanism. For example, one such factor may be airflow generated by the rotor fan blade.

If the determined temperature is greater than or equal a first temperature threshold at STEP 1110, the controller 800 controls the impulse tool 10 to shut down or otherwise disable operation of the impulse tool 10 (STEP 1215). If the determined temperature is less than a first temperature threshold at STEP 1210, the controller 800 compares the determined temperature to a second temperature threshold (STEP 1220). If the determined temperature is less than the first temperature threshold but greater than or equal to the second temperature threshold at STEP 1220, the amount of time for which the determined temperature is less than the first temperature threshold but greater than or equal to the second temperature threshold is compared to a time threshold (STEP 1225).

If the time threshold has been reached at STEP 1225, the controller 800 controls the impulse tool 10 to shut down or otherwise disable operation of the impulse tool 10 (STEP 1215). In some embodiments, when the impulse tool 10 shuts down or is otherwise disabled, heat may quickly saturate a stator region as heat transfers from a gearcase mechanism toward a cooling fan of the impulse tool 10. The determined temperature based on signals from the temperature sensors 400, 515 positioned on the Hall effect sensor PCB 505 may rise to a temperature that is closer to the temperature of the fluid. Stopping the motor 22 generally causes a rise in the determined temperature based on signals from the temperature sensors 400, 515 positioned on the Hall effect sensor PCB 505

If, at STEP 1220, the determined temperature is not greater than or equal to the second temperature threshold, the process 1200 returns to STEP 1205. If, at STEP 1225, the time threshold has not been satisfied, the process 1200 returns to STEP 1205. In some embodiments, when the determined temperature is less than the first temperature threshold but greater than or equal to the second temperature threshold and the time threshold has not been satisfied, the controller 800 drives the motor 22, impulse assembly 18, or both, harder or faster, respectively, to compensate for a loss of drivetime when the impulse tool 10 is shut down due to the time threshold being satisfied. In some embodiments, controller 800 increases the speed of the motor 22, drives the impulse assembly 18 harder, or both, to compensate for changes in the performance of the impulse tool 10 due to an increase in the temperature of the fluid in the impulse assembly 18. In some embodiments, the controller 800 may calculate an optimal torque, an optimal speed, or both, for compensating for performance loss due to the viscosity of the fluid changing as the temperature of the fluid changes. The controller 800 may increase the speed of the motor 22, drive the impulse assembly 18 harder, or both, by implementing field weakening (e.g., controlling a conduction angle, controlling phase advance, implementing negative id injection in a field-oriented control motor control technique, etc.

In some embodiments, when the determined temperature is less than the first temperature threshold but greater than or equal to the second temperature threshold and the time threshold has not been satisfied, the controller 800 notifies a user that the tool may be too hot via, for example, one or more of the indicators 1140. For example, a notification that the impulse tool 10 may be too hot includes the motor 22 coasting to a stop, outputting a noise, blinking a light (for example, a work light LED 1145), a combination of the foregoing, or the like.

In some embodiments, the time threshold utilized in the process 1200 is a greater amount of time than the amount of time that applications of the impulse tool 10 typically take. Therefore, a user may turn off or shut down the impulse tool 10 before the time threshold is ever satisfied at STEP 1225. However, the amount of time the impulse tool 10 needs to complete an application or task may increase when the temperature of the fluid in the impulse assembly 18 is high. In some embodiments, instead of a time threshold, the process 1200 may utilize a threshold number of rotations of the motor 22, a threshold number of cycles of the impulse tool 10, or the like.

Figure 13:
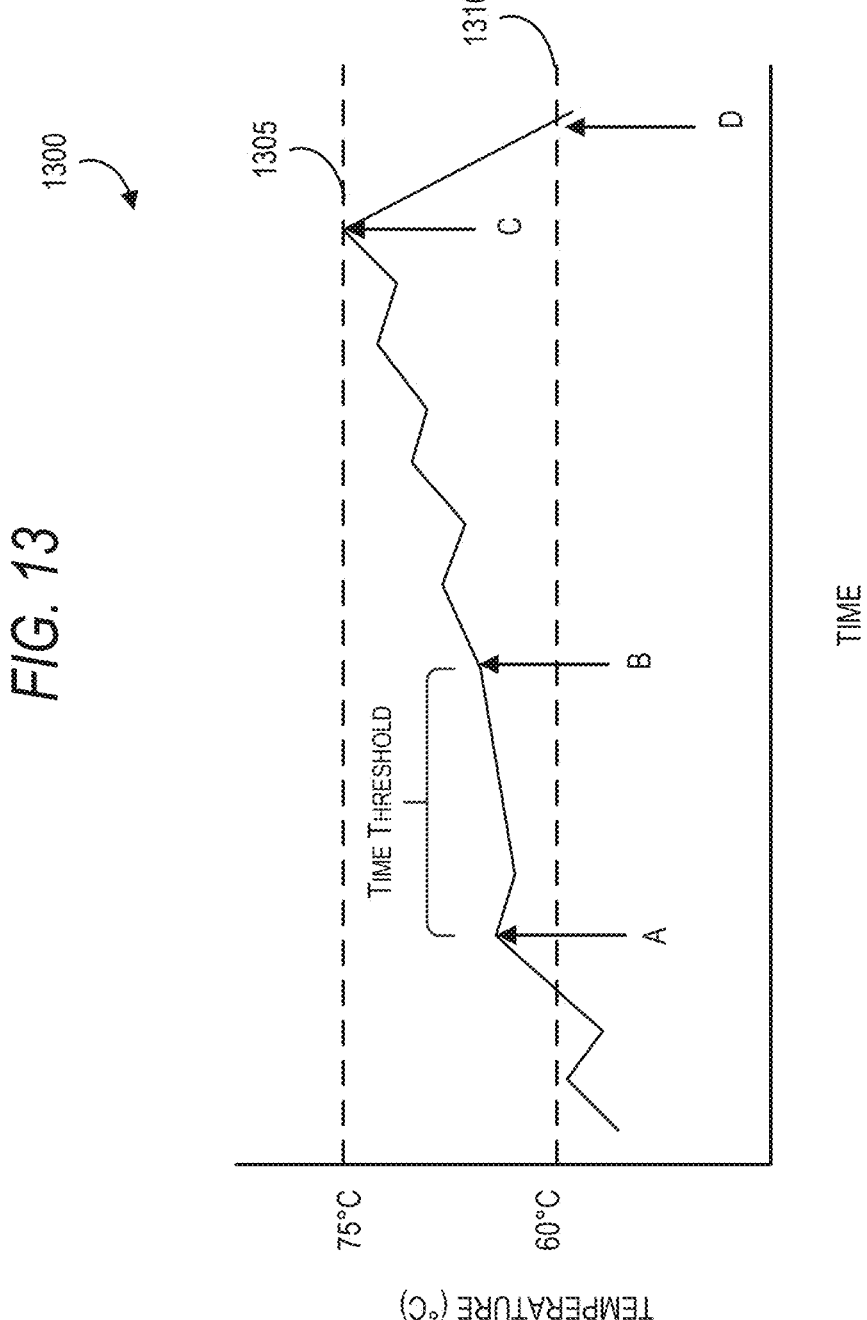
FIG. 13 is a graph illustrating operation of the power tool of FIG. 1, according to some embodiments.

FIG. 13 illustrates a graph 1300 of the operation of the impulse tool 10 based on the temperature determined based on one or more signals from temperature sensors positioned on the Hall effect sensor PCB 505. A first temperature threshold 1305 (e.g., 75° C.) and a second temperature threshold 1310 (e.g., 60° C.) are illustrated. At point A, the controller 800 determines that the determined temperature is greater than the second threshold but less than the first threshold. In such a case, a timer can be started and compared to a time threshold (e.g., 30 seconds). If the determined temperature remains between the two temperature thresholds for the time threshold, the impulse tool 10 can be, for example, shut down at point B. In some embodiments, hysteresis can be used to control thermal shutdown based on a loss of heat. At point C, the determined temperature reaches the first temperature threshold 1305, and the controller 800 controls the impulse tool 10 to, for example, shut down to force cooling at point D (e.g., a required amount of temperature drop [e.g., 15° C.] before the impulse tool 10 can be restarted). In some embodiments, cooling of the impulse tool 10 may be performed by a rotor fan. In some implementations, active cooling solutions auxiliary to the movement of the motor 22, such as additional fans, thermo-electric coolers, liquid cooling pumps, or the like, can be employed to cool the impulse tool 10. In some embodiments, the graph 1300 corresponds to the control of the impulse tool 10 based on one or more temperature signals from the temperature sensors 400, 515.

As illustrated in FIG. 11 and FIG. 13 by the temperature threshold 1105 of 80° C. and the first temperature threshold 1305 of 75° C., respectively, a temperature threshold may be higher when a determined temperature is based on one or more signals from temperature sensors positioned away from a path of airflow circulation in the impulse tool 10 than a temperature threshold is when the determined temperature is based on one or more signals from temperature sensors positioned on, for example, the Hall effect sensor PCB 505. For example, temperature sensors positioned on the Hall effect sensor PCB 505 are more easily influenced by external factors, such as airflow, than from temperature sensors positioned away from a path of airflow circulation in the impulse tool 10.

The processes 1000, 1200 can be implemented independently of one another or in conjunction with one another. As a result, one process 1000, 1200 can function as a failsafe for the other process 1000, 1200 in the event, for example, of the failure of a temperature sensor. In another example, measurements made by temperature sensors 400, 515 positioned on a Hall effect sensor PCB 505 may be more easily influenced by external factors than measurements made by temperature sensors 405, 615 positioned away from a path of airflow circulation in the impulse tool 10. For example, when a user of the impulse tool 10 uses compressed air to cool the impulse tool 10, the fluid in the impulse assembly 18 and temperature sensors 405, 615 positioned away from a path of airflow circulation in the impulse tool 10 may not be cooled by the compressed air as quickly as temperature sensors 400, 515 positioned on a Hall effect sensor PCB 505. Therefore, in this example, a temperature determined based on one or more signals from the temperature sensors 405, 615 positioned away from a path of airflow circulation in the impulse tool 10 may be a more accurate reflection of the temperature of the fluid in the impulse assembly 18 than a temperature determined based on one or more signals from the temperature sensors 400, 515 positioned on a Hall effect sensor PCB 505. In some embodiments, the temperature thresholds described herein are static values (e.g., 75° C.). In some embodiments, the temperature sensors 400, 405, 515, 615, 700 can be used to measure temperature regardless of whether the trigger 1130 is being pulled.

In some embodiments, the controller 800 is configured to determine a relationship between heat dissipation and time since a most recent application of the impulse tool 10. In some embodiments, one or more of the temperature thresholds can be dynamically modified (e.g., based on operational mode, ambient temperature, etc.). For example, the impulse tool 10 may include a real time clock, a coin cell battery, or both, and the controller 800 may adjust one or more of the temperature thresholds based on whether the impulse tool 10 is currently running or recently stopped running, battery life, the duty cycle of an application, a time since the most recent application of the impulse tool 10 completed, and a relationship between heat dissipation and time.

In some embodiments, when a temperature produces inaccurate or unrealistic readings, the controller 800 may ignore the readings from one or all of the temperature sensors 400, 405, 515, 615, 700 and operate the impulse tool 10 in an unrestricted manner (without performing processes 900, 1000, or 1200). When operating in an unrestricted manner, the impulse tool 10 may experience thermal failure, but, until the thermal failure occurs, the user's workflow is not interrupted.

Thus, embodiments described herein provide, among other things, a power tool including an impulse assembly. Various features and advantages are set forth in the following claims.

What is claimed is:

1. A power tool comprising:
   a motor;
   an impulse assembly configured to be driven by the motor;
   a temperature sensor configured to output a signal related to a temperature of the power tool, the temperature of the power tool being correlated to a temperature of a fluid within the impulse assembly; and
   a controller connected to the temperature sensor, the controller configured to:
      determine the temperature of the power tool based on the signal from the temperature sensor,
      control, in response to the temperature of the power tool being greater than a first temperature threshold, the power tool based on the temperature of the power tool,
      compare, in response to the temperature of the power tool being less than the first temperature threshold and greater than or equal to a second temperature threshold, an amount of time for which the temperature of the power tool is less than the first temperature threshold and greater than or equal to the second temperature threshold to a time threshold, and disable, in response to the amount of time reaching the time threshold, the power tool.

2. The power tool of claim 1, wherein, to control the power tool based on the temperature of the power tool, the controller is configured to one of shut down the power tool or reduce an output of the power tool.

3. The power tool of claim 1, wherein the temperature sensor is positioned away from a path of airflow circulation within the power tool.

4. The power tool of claim 3, wherein the temperature sensor is positioned on a light assembly printed circuit board ("PCB").

5. The power tool of claim 1, wherein the temperature sensor is positioned on a Hall effect sensor printed circuit board ("PCB").

6. A power tool comprising:

a motor;

an impulse assembly configured to be driven by the motor;

a first temperature sensor configured to output a first signal related to a temperature of the power tool, the temperature of the power tool being correlated to a temperature of a fluid within the impulse assembly;

a second temperature sensor configured to output a second signal related to the temperature of the power tool, the temperature of the power tool being correlated to the temperature of the fluid within the impulse assembly; and a controller connected to the first temperature sensor and the second temperature sensor, the controller configured to:

determine the temperature of the power tool based on the first signal from the first temperature sensor and the second signal from the second temperature sensor, control, in response to the temperature of the power tool being greater than a first temperature threshold, the power tool based on the temperature of the power tool, compare, in response to the temperature of the power tool being less than the temperature threshold and greater than or equal to a second temperature threshold, an amount of time for which the temperature of the power tool is less than the first temperature threshold and greater than or equal to the second temperature threshold to a time threshold, and disable, in response to the amount of time reaching the time threshold, the power tool.

7. The power tool of claim 6, wherein, to control the power tool based on the temperature of the power tool, the controller is configured to shut down the power tool.

8. The power tool of claim 6, wherein the first temperature sensor and the second temperature sensor are positioned away from a path of airflow circulation within the power tool.

9. The power tool of claim 8, wherein the first temperature sensor is positioned on a light assembly printed circuit board ("PCB").

10. The power tool of claim 9, wherein the second temperature sensor is positioned on a Hall effect sensor PCB.

11. A method of controlling a power tool, the method comprising:

receiving, from a temperature sensor, a signal related to a temperature of the power tool, the temperature of the power tool being correlated to a temperature of a fluid within an impulse assembly;

determining the temperature of the power tool based on the signal from the temperature sensor;

controlling, in response to the temperature of the power tool being greater than a first temperature threshold, the power tool based on the temperature of the power tool;

comparing, in response to the temperature of the power tool being less than the temperature threshold and greater than or equal to a second temperature threshold, an amount of time for which the temperature of the power tool is less than the first temperature threshold and greater than or equal to the second temperature threshold to a time threshold; and disabling, in response to the amount of time reaching the time threshold, the power tool.

12. The method of claim 11, wherein controlling the power tool based on the temperature of the power tool includes one or shutting down the power tool or reducing an output of the power tool.

13. The method of claim 11, wherein the temperature sensor is positioned away from a path of airflow circulation within the power tool.

14. The method of claim 13, wherein the temperature sensor is positioned on a light assembly printed circuit board ("PCB").

15. The method of claim 13, wherein the temperature sensor is positioned on a Hall effect sensor printed circuit board ("PCB").

16. The method of claim 11, wherein the temperature sensor is positioned within the impulse assembly.

17. The method of claim 11, further comprising:

receiving, from a second temperature sensor, a second signal related to the temperature of the power tool, the temperature of the power tool being correlated to the temperature of the fluid within an impulse assembly.

* * * * *